United States Patent
Reed et al.

(10) Patent No.: US 11,069,363 B2
(45) Date of Patent: Jul. 20, 2021

(54) METHODS, SYSTEMS AND APPARATUS FOR MANAGING VOICE-BASED COMMANDS

(71) Applicant: Cirrus Logic International Semiconductor Ltd., Edinburgh (GB)

(72) Inventors: Kieran Reed, Bonbeach (AU); Hock Lim, Balwyn (AU)

(73) Assignee: Cirrus Logic, Inc., Austin, TX (US)

( * ) Notice: Subject to any disclaimer, the term of this patent is extended or adjusted under 35 U.S.C. 154(b) by 126 days.

(21) Appl. No.: 16/229,411

(22) Filed: Dec. 21, 2018

(65) Prior Publication Data
US 2020/0202868 A1 Jun. 25, 2020

(51) Int. Cl.
  *G10L 17/22* (2013.01)
  *G10L 17/06* (2013.01)
  *G10L 17/00* (2013.01)
  *H04M 1/02* (2006.01)

(52) U.S. Cl.
  CPC .............. *G10L 17/22* (2013.01); *G10L 17/00* (2013.01); *G10L 17/06* (2013.01); *H04M 1/0202* (2013.01)

(58) Field of Classification Search
  CPC ......... G10L 17/22; G10L 17/00; G10L 17/06; G10L 15/22; G10L 2015/223; H04M 1/0202; H04M 1/72558; H04M 2201/40; G06F 3/167
  See application file for complete search history.

(56) References Cited

U.S. PATENT DOCUMENTS

| | | | |
|---|---|---|---|
| 9,652,196 B2 | 5/2017 | Davis et al. | |
| 2008/0262382 A1* | 10/2008 | Akkermans | G07C 9/37 600/559 |
| 2016/0127900 A1* | 5/2016 | John Archibald | H04W 4/80 726/7 |
| 2017/0025124 A1* | 1/2017 | Mixter | G10L 15/32 |
| 2017/0215011 A1* | 7/2017 | Goldstein | H04R 25/305 |
| 2019/0228780 A1* | 7/2019 | Athias | G06F 21/32 |
| 2020/0202866 A1* | 6/2020 | Langenberg | G07C 9/00563 |

OTHER PUBLICATIONS

Nellis, Stephen, Amazon.com, Qualcomm to put Alexa assistant in more headphones, Oct. 22, 2018, https://finance.yahoo.com/news/amazon-com-qualcomm-put-alexa-011120438.html.
Lardinois, Frederic, Google Home can now recognize up to six voices and give personalized responses; Apr. 20, 2017, https://techcrunch.com/2017/04/20/google-home-can-now-recognize-up-to-six-voices-and-give-personalized-responses/.
Goodwin, John D. et al., U.S. Appl. No. 62/783,024, Audio-Based Access Control, filed Dec. 20, 2018.

* cited by examiner

*Primary Examiner* — Yogeshkumar Patel
(74) *Attorney, Agent, or Firm* — Jackson Walker L.L.P.

(57) ABSTRACT

A primary device arranged to communicate with one or more secondary devices across a communications network. The primary device comprises at least one processor and memory comprising computer executable instructions, which when executed by the at least one processor, are configured to: receive an audio signal comprising a voice command associated with a user; determine a secondary device associated with the user from the one or more secondary devices; and transmit a response to the voice command to the determined secondary device.

19 Claims, 3 Drawing Sheets

METHODS, SYSTEMS AND APPARATUS FOR MANAGING VOICE-BASED COMMANDS

TECHNICAL FIELD

The present disclosure relates to methods, systems and apparatus for managing voice-based commands Some embodiment relate to methods, systems and apparatus for managing voice-based commands in environments including a plurality of devices configured to perform a variety of functions.

BACKGROUND

Many homes and other such environments are now equipped with audio-streaming devices and other speaker devices configured to determine and respond to voice-based commands, such as commands to play music, video, and answers to questions, such as trivia or news etc.

It is desired to address or ameliorate one or more shortcomings of known speaker or hub devices or to at least provide a useful alternative thereto.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each of the appended claims.

SUMMARY

According to an aspect of the disclosure, there is provided a primary device arranged to communicate with one or more secondary devices across a communications network, the primary device comprising:
  at least one processor;
  memory comprising computer executable instructions, which when executed by the at least one processor, are configured to:
    receive an audio signal comprising a voice command associated with a user;
    determine a secondary device associated with the user from the one or more secondary devices; and
    transmit a response to the voice command to the determined secondary device.

The secondary device may comprise or be one of: (i) a headset/headphones/earphones/earbuds and (ii) a smartphone.

In some embodiments, the at least one processor is configured to identify the user based on the voice command and to determine the secondary device associated with the user based on the identification of the user. For example, the at least one processor may be configured to access a user register to determine the secondary device, wherein the user register comprises at least one registered user identifier and one or more secondary device identifiers associated with each of the at least one registered user identifier.

In some embodiments, prior to receiving the audio signal, the at least one processor may be configured to receive a notification signal to expect to receive the audio command and to determine the secondary device associated with the user based on the notification signal. The secondary device may be determined to be a device from which the notification signal is received.

In some embodiments, the at least one processor is configured to identify the user based on received biometric data and to determine the secondary device associated with the user based on the identification of the user. For example, the at least one processor may be configured to access a user register to determine the secondary device, wherein the user register comprises biometric data and one or more secondary device identifiers for each registered user. Identifying the user based on biometric data may comprise comparing ear features of received biometric data to stored biometric templates of registered users, wherein the biometric templates include ear prints for the users. Alternatively or in addition, identifying the user based on biometric data may comprise comparing voice features of received biometric data associated with the issuer of the voice command to stored biometric templates of registered users, wherein the biometric templates include voice features for the users.

The primary device may comprise one or more microphones configured to receive audio signals and to provide the audio signals to the processor and wherein the audio signal comprising the voice command associated with the user may be received by the one or more microphones of the primary device.

In some embodiments, the audio signal comprising the voice command associated with the user is received from a secondary device of the one or more secondary devices. In some embodiments, the audio signal comprising the voice command associated with the user is received from a secondary device of the one or more secondary devices and the secondary device is determined to be the secondary device from which voice command is received.

The primary device may be further configured to receive authentication data and verify the authentication data prior to transmitting the response to the secondary device. For example, the authentication data may comprises one or more of: (i) an indicator indicating that the secondary device is paired or otherwise connected with the primary device, (ii) an indicator indicating that the secondary device is being worn or used by a user, and/or (iii) an indicator indicating that it is the assigned user that is wearing or using the secondary device. The authorisation data may comprise biometric data. The authorisation data may comprise (i) voice data and/or (ii) ear print data.

In some embodiments, prior to routing the response, the primary device is configured to authorise the routing of the response to the secondary device by verifying biometric data of the user associated with the secondary device. The received biometric data may be extracted from the voice command and/or may be received from a secondary device.

In some embodiments, the primary device is configured to verify the user based on biometric data by comparing ear features of received biometric data to stored biometric templates of registered users, wherein the biometric templates include ear prints for the users, and determining that the received biometric data matches the stored biometric template within a given tolerance. The received biometric data may comprise (i) ear prints associated with the issuer of the voice command and/or (ii) ear prints associated with a user wearing a headset/earphones of the secondary device.

According to an aspect of the disclosure, there is provided a method for managing voice-based commands, the method comprising:
  receiving, at a primary device arranged to communicate with one or more secondary devices across a communications network, an audio signal comprising a voice command associated with a user;

determining a secondary device associated with the user from the one or more secondary devices; and transmitting a response to the voice command to the determined secondary device.

In some embodiments, the method further comprises identifying the user based on the voice command and determining the secondary device associated with the user comprises determining the secondary device associated with the user based on the identification of the user. For example, determining the secondary device associated with the user based on the identification of the user may comprise accessing a user register, wherein the user register comprises at least one registered user identifier and one or more secondary device identifiers associated with each of the at least one registered user identifier.

In some embodiments, prior to receiving the audio signal, the method comprises receiving, at the primary device, a notification signal to expect to receive the audio command and determining the secondary device associated with the user comprises determining the secondary device associated with the user based on the notification signal. For example, the method may comprise determining the secondary device as the secondary device from which the notification signal is received.

In some embodiments, determining the secondary device associated with the user comprises identifying the user based on received biometric data and determining the secondary device associated with the user based on the identification of the user. For example, determining the secondary device associated with the user may comprise accessing a user register to determine the secondary device, wherein the user register comprises biometric data and one or more secondary device identifiers for each registered user. In some embodiments, identifying the user based on biometric data comprises comparing ear features of received biometric data to stored biometric templates of registered users, wherein the biometric templates include ear prints for the users. For example, identifying the user based on biometric data may comprise comparing voice features of received biometric data associated with the issuer of the voice command to stored biometric templates of registered users, wherein the biometric templates include voice features for the users.

The method may comprise receiving the audio signal comprising the voice command associated with the user from one or more microphones of the primary device. The method may comprise receiving the audio signal comprising the voice command associated with the user from a secondary device of the one or more secondary devices. The method may comprise receiving the audio signal comprising the voice command associated with the user from a secondary device of the one or more secondary devices and wherein determining the secondary device as the secondary device from which voice command is received.

In some embodiments, the method further comprises receiving authentication data and verifying the authentication data prior to transmitting the response to the secondary device. For example, the authentication data may comprises one or more of: (i) an indicator indicating that the secondary device is paired or otherwise connected with the primary device, (ii) an indicator indicating that the secondary device is being worn or used by a user, and/or (iii) an indicator indicating that it is the assigned user that is wearing or using the secondary device. The authorisation data may comprises biometric data. The authorisation data may comprise (i) voice data and/or (ii) ear print data.

In some embodiments, prior to routing the response, the method comprises verifying authorisation data of the user associated with the secondary device and authorising the routing of the response to the secondary device. The method may comprise extracting the authorisation data from the voice command and/or receiving the authorisation data from a secondary device.

In some embodiments, verifying the user based on biometric data comprises comparing ear features of received biometric data to stored biometric templates of registered users, wherein the biometric templates include ear prints for the users, and determining that the received biometric data matches the stored biometric template within a given tolerance. The received biometric data may comprise (i) ear prints associated with the issuer of the voice command and/or (ii) ear prints associated with a user wearing a headset/earphones of the secondary device.

According to another aspect of the disclosure, there is provided a non-transitory computer-readable storage medium comprising instructions which, when executed by at least one processor, cause the at least one processor to carry out the method described above.

BRIEF DESCRIPTION OF DRAWINGS

By way of example only, embodiments are now described with reference to the accompanying drawings, in which.

DESCRIPTION OF EMBODIMENTS

Described embodiments relate to methods, systems and apparatus for managing voice-based commands. In particular, some embodiments relate to smart routing of responses to voice-based commands to selected personal electronic devices. For example, response may be routed to personal electronic devices associated with users having issued the voice—based commands or to personal electronic devices verified as being associated with particular users. In this way, improved privacy conditions for users can be achieved within environments where multiple personal electronic devices, such as headsets/headphones and smartphones, are communicating with a primary or main device, such as in a home environment. For example, a user issuing a voice-based command to the primary or main device can receive a response to that command routed to their personal electronic device, such as headsets/headphones and smartphones, as opposed to having it broadcast or delivered to a speaker associated with the primary or main device and being accessible to other users in the environment.

Figure 1:
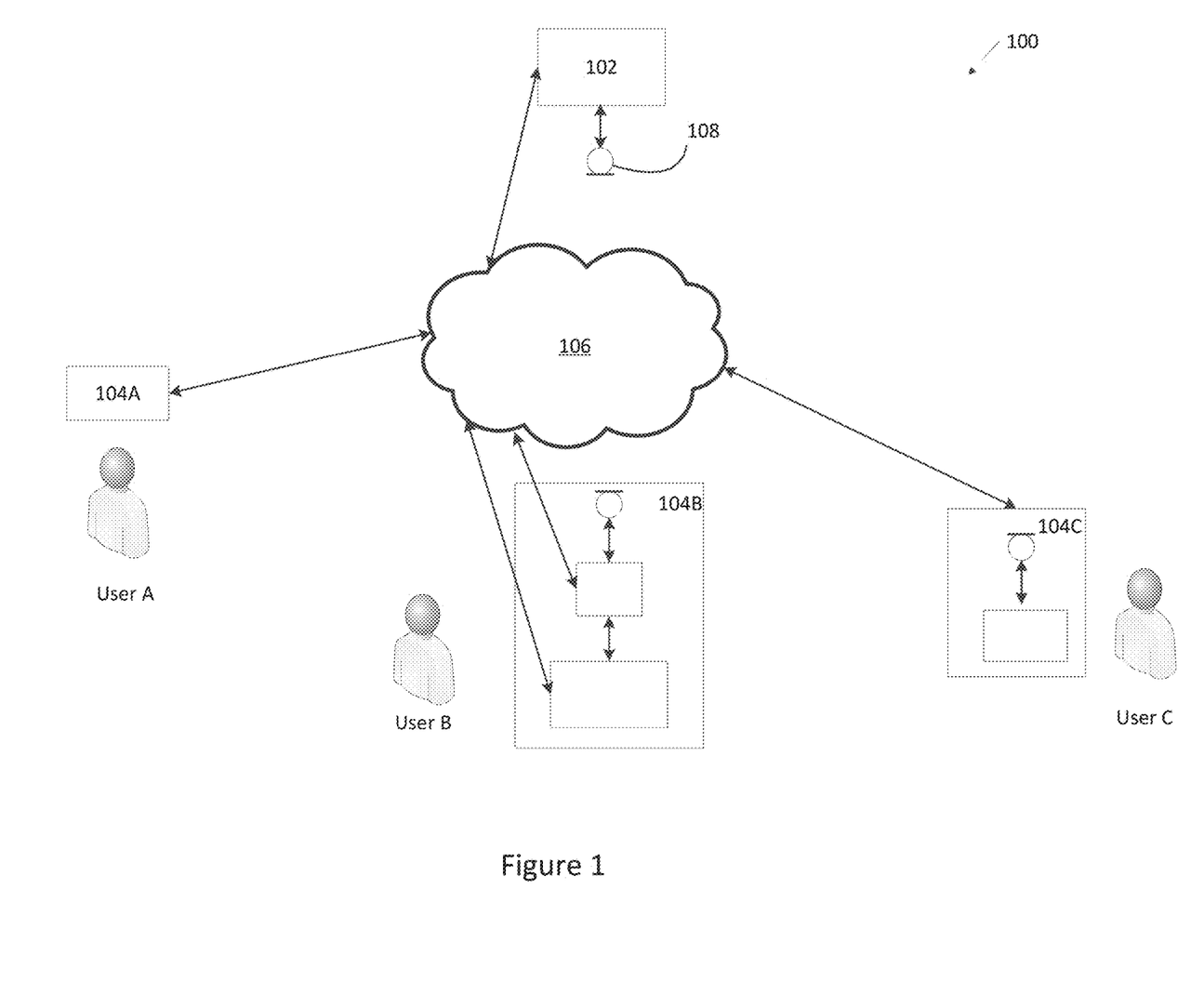
FIG. 1 is a schematic diagram illustrating a communications system for managing voice-based commands, according to some embodiments.

Referring to FIG. 1, there is shown a communications system 100 comprising a primary device 102 in communication with a plurality of secondary devices 104 across a communications network 106. For example, in some embodiments, the primary device 102 may comprise a listening type device, an audio-streaming device or other such speaker type device. The communications network 106 may include one or a combination of many different types of networks (LAN, WLAN etc.). The communications system 100 may be provided in a particular environment, such as a home environment.

As shown in FIG. 1, the secondary device 104 may include one or more of a headset/headphones/earphones/earbuds, a smartphone and a microphone and each secondary device 104 is associated with a respective user. For example, the secondary device 104A associated with User A is a headset/headphones/earphones/earbuds, the secondary device 104B associated with User B comprises a headset/headphones, a smartphone and a microphone, and the secondary device 104C associated with User C comprises a headset/headphones and a microphone.

The primary device 102 comprises or is coupled to at least one microphone 108. The microphone 108 is configured to receive voice commands from one or more users associated with the secondary devices 104 and to provide audio signals associated with the voice commands to the primary device 102. In other embodiments, voice commands of the users are received by microphones of the secondary devices 104 associated with the respective user or another user and audio signals associated with the voice commands are provided by the secondary devices 104 to the primary device 102. For example, a voice command from User B may be picked up by microphone 108 of the primary device, by microphone of secondary device 104B and provided to the primary device 102 or by microphone of secondary device 104C and provided to the primary device 102.

The primary device 102 is configured to process the audio signals to determine a response to the voice command of a user and to provide the response to at least one secondary device 104 associated with that user or to another selected user.

In some embodiments, the primary device 102 is configured to determine or identify the user associated with the voice command and based on the identity of the user, determine a secondary device 104 associated with the user to which to route the response, for example, by consulting the user register 204. In some embodiments, the primary device 102 determines the secondary device 104 associated with the user to which to route the response as being the secondary device 104 from which the voice command was received. In some embodiments, the primary device 102 determines the secondary device 104 associated with the user as being a secondary device 104 from which a notification signal from the user is received, as discussed in more detail below.

Figure 2A:
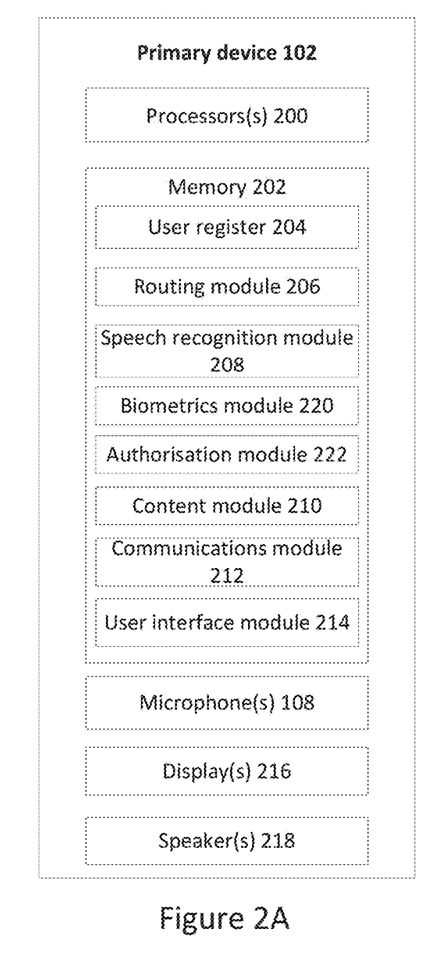
FIG. 2A is a schematic diagram of a primary device of the communications system of FIG. 1.

As illustrated in FIG. 2, the primary device 102 comprises one or more processors 200 and memory 202. Memory 202 comprises computer executable instructions, which when executed by the one or more processors 200, are configured to cause the primary device 102 to perform the functions described herein. The memory 202 may be volatile (such as random access memory (RAM)) and/or non-volatile (such as read-only memory (ROM), flash memory, etc.).

Figure 2B:
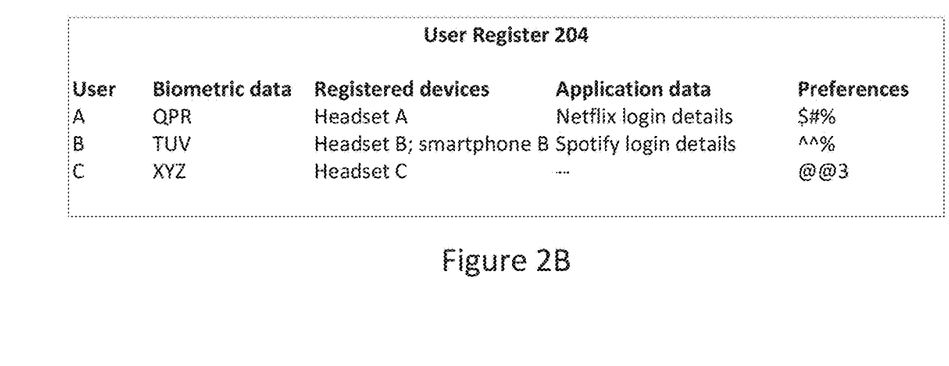
FIG. 2B is an example of a user register of the primary device of FIG. 2A, according to some embodiments.

In some embodiments, memory 202 includes a user register 204 or database arranged to store information relating to users of the system 100. In other embodiments, user register 204 is stored remotely from but accessible to the primary device 102. An example of a user register is shown in FIG. 2B. As illustrated, the user register 204 comprises an identifier of one or more secondary devices 104 associated with the user.

The user register 204 may also comprise biometric data associated with the user (biometric template), which may include identifiers such as voice samples, fingerprints, facial images, ear biometric features ("ear print") etc. For example, the ear biometric features may comprise one or more of the following: one or more resonant frequencies; one or more antiresonant frequencies; otoacoustic emissions; heart-rate variability; and bone-conducted voice signals.

Acoustic properties of a user's ear, whether the outer parts (known as the pinna or auricle), the ear canal or both, differ substantially between individuals and can therefore be used as a biometric to identify the user. One method for achieving this is for one or more loudspeakers (or similar transducers) positioned close to or within the ear to generate an acoustic stimulus, and one or more microphones similarly positioned close to or within the ear to detect the acoustic response of the ear to the acoustic stimulus. One or more features may be extracted from the response signal, and used to characterize the individual. Other forms of ear biometric data (such as heart rate variability and bone-conducted voice signals, for example) may require only the detection of an audio signal without a preceding acoustic stimulus.

In some embodiments, secondary devices 104 comprising one or more loudspeakers and one or more microphones may be utilised to generate biometric data related to the user's ear. The loudspeaker is operable to generate an acoustic stimulus, or acoustic probing wave, towards the user's ear, and the microphone is operable to detect and measure a response of the user's ear to the acoustic stimulus, e.g. to measure acoustic waves reflected from the ear canal or the pinna, and/or to acquire other ear biometric data. The acoustic stimulus may be sonic (for example in the audio frequency range of say 20 Hz to 20 kHz) or ultra-sonic (for example greater than 20 kHz or in the range 20 kHz to 50 kHz) or near-ultrasonic (for example in the range 15 kHz to 25 kHz) in frequency. In some examples the microphone signal may be processed to measure received signals of the same frequency as that transmitted.

Another biometric marker may comprise otoacoustic noises emitted by the cochlear in response to the acoustic stimulus waveform. The otoacoustic response may comprise a mix of the frequencies in the input waveform. For example if the input acoustic stimulus consists of two tones at frequencies f1 and f2, the otoacoustic emission may include component at frequency $2*f1-f2$. The relative power of frequency components of the emitted waveform has been shown to be a useful biometric indicator. In some examples the acoustic stimulus may comprise tones of two or more frequencies and the amplitude of mixing products at sums or differences of integer-multiple frequencies generated by otoacoustic emissions from the cochlear may be measured. Alternatively, otoacoustic emissions may be stimulated and measured by using stimulus waveforms comprising fast transients, e.g. clicks. Depending on the construction and usage of the secondary device 104, the measured response may comprise user-specific components, i.e. biometric data, relating to the auricle, the ear canal, or a combination of both the auricle and the ear canal.

In some embodiments, secondary devices 104 comprising one or more microphones may be operable to detect bone-conducted voice signals from the user. That is, as the user speaks, sound is projected away from the user's mouth through the air. However, acoustic vibrations will also be carried through part of the user's skeleton or skull, such as the jaw bone. These acoustic vibrations may be coupled to the ear canal through the jaw or some other part of the user's skeleton or skull, and detected by the microphone. Lower frequency sounds tend to experience a stronger coupling than higher frequency sounds, and voiced speech (i.e. that speech or those phonemes generated while the vocal cords are vibrating) is coupled more strongly via bone conduction than unvoiced speech (i.e. that speech or those phonemes generated while the vocal cords are not vibrating).

A further ear biometric feature which may be extracted from audio signals acquired from a user's ear relates to cardiac sounds. That is, phonocardiograms have been shown to be useful in distinguishing between individuals. See, for example, "Biometric Identification Based on Frequency Analysis of Cardiac Sounds", by Beritelli and Serrano, IEEE Transactions on Information Forensics and Security (Volume 2, Issue 3, pages 596-604, 2007). One particular feature which may be useful as a biometric is the variability of the R-R interval (i.e. the period between successive R peaks, where R is a point corresponding to the peak of the QRS complex of the electrocardiogram wave).

Further details regarding the determination of ear biometric features are disclosed in U.S. patent application Ser. No. 15/927,824 entitled "Ear Proximity Detection" which was filed on 21 Mar. 2018, and is incorporated herein by reference.

In some embodiments, the user register 204 may further include user's access information for services and social media, such as login details for a Spotify or Netflix account, and/or user preferences.

Memory 202 includes a routing module 206, which when executed by the one or more processors 200, is configured to determine a suitable secondary device 104 within the environment to which to route or transmit a response to a voice command. For example, and as elaborated on below, the routing module 206 may determine one or more suitable secondary devices 104 to which to transmit a response to a voice command issued by a user and to transmit the response to the one or more identified suitable secondary devices 104. For example, the routing module 206 may receive an indication of the user who issued the command from a biometrics module 220 and determine one or more suitable secondary devices 104 to which to transmit the response from the user register 104 based on the identity of the user. The routing module 206 may also receive content to be transmitted to the secondary device 204 from a content module 210.

Memory 202 may include a biometrics module 220, which when executed by the one or more processors 200, is configured to identify or authenticate a user. The biometrics module 220 may extract biometrics data or features from a received signal and compare the extracted data with biometric templates of registered users of the system 100, as for example, may be stored in user register 204, to identify or authenticate a user. For example, the biometrics module 220 may use voice recognition techniques or ear print recognition techniques to identify a user associated with a received voice-based command or to authenticate or confirm that a suspected user is the user associated with a received voice-based command.

Memory 202 may include an authorisation module 222, which when executed by the one or more processors 200, is configured to authorise the routing of the response to the secondary device. In some embodiments, the authorisation module 222 is configured to authenticate or verify that the secondary device 104 to which the response is to be routed, and/or the user associated with that the secondary device 104, is the authorised device and/or user, respectively. For example, the authorisation module 222 may control whether or not a response is routed by the routing module 206. In this way, the authorisation module 222 may provide for increased levels of security and/or privacy in the system 100. For example, the authorisation module 222 of the primary device 102 may be configured to receive authentication data, which may be used to authenticate the selected secondary device 104 to which the response is to be routed and to authorise the routing of the response to that secondary device 104. In some embodiments, the authentication data is received from a secondary device 104 or other device and in some embodiments, the authentication data is extracted from the voice command.

The authentication data may comprise configuration data such as (i) an indicator indicating that a headset/headphones/earphones/earbuds of the secondary device is paired or otherwise connected with the primary device 102, (ii) the headset/headphones/earphones/earbuds are being worn by a user, and/or (iii) it is the assigned user that is wearing the headset/headphones/earphones/earbuds.

For example, determination of whether the headset/headphones/earphones/earbuds are being worn by a user may be determined by availing of in-ear detect techniques. In some embodiments, the secondary devices 104 may perform an in-ear detect function, i.e. to detect the presence or absence of an ear in proximity to the secondary device 104, and provide an indication of the presence or absence of an ear (any ear) in proximity to the primary device 102. Audio signals acquired in the absence of any ear may have no heartbeat, no resonant frequencies or anti-resonant frequencies, no otoacoustic emissions, etc and may be readily distinguished from biometric input signals which are indicative of the presence of any ear.

In some embodiments, the secondary device 104 may be configured to acquire biometric data from a user and provide the biometric data to the primary device 102 for authentication and/or identification purposes. For example, the secondary device 104 may generate an acoustic stimulus for application to the user's ear, and detect or measure the response of the ear to the acoustic stimulus in order to acquire ear biometric data.

The authorisation module 222 may be configured to compare the received biometric data (extracted from a received audio signal, for example) with voice samples and/or ear prints of the registered users, as may be stored, for example, in the user register 204. If the authorisation module 222 determines that the received biometric data matches the biometric template of a registered user (for example, within a given tolerance) and that registered user is the user associated with the selected secondary device, the authorisation module 222 may authorise the routing module to route the response to the secondary device 104. On the other hand, if the received biometric data does not match a biometric template of a registered user or does match a biometric template of a registered user but that registered user is not the user associated with the selected secondary device, the authorisation module 222 may deny authorisation and may prevent the routing module 206 from transmitting the response to the selected secondary device 104.

Apparatus, systems, methods and computer programs for ear proximity detection and authentication are disclosed in U.S. patent application Ser. No. 15/927,824 entitled "Ear Proximity Detection" which was filed on 21 Mar. 2018, and is incorporated herein by reference.

Memory 202 may also include the speech recognition module 208, which when executed by the one or more processors 200, is configured to process a voice command to identify or determine a request being made by the user.

Memory 202 may also include the content module 210, which when executed by the one or more processors 200, is configured to determine a response to the request of the voice command. For example, the speech recognition module 208 may process a voice command to decipher the request and pass the request to the context module 210, which then determines a response to the request. The content module 210 may communicate and obtain or receive data from any suitable source, including a social network source or service provider source associated with the user. The content module 210 may then provide the response to the routing module 206 to be transmitted to one or more selected secondary devices 104 associated with the user that issued the voice command. For example, the content module 210 may avail of user data, such as login details, as may be stored in the user register 204, to access content from a third party content provider, such as Spotify.

Memory 202 includes a communications interface module 212 to enable the primary device 102 to communicate with the plurality of secondary devices 104 across the communications network 106. The communications interface module 212 may provide for wired or wireless connections with the plurality of secondary devices 104 and/or other computing devices. For example, the communications interface module 212 may provide for communication with the plurality of secondary devices 104 via wireless radio communication such as WiFi, Bluetooth, Zigbee or any other suitable communications protocol.

In some embodiments, memory 202 includes a user interface module 214 to allow user interaction with the primary device 102. For example, the user interface module 214 may be configured to receive inputs from a user, such as audio, visual and/or keyboard or mouse-type inputs and to provide outputs to the user, for example, such as audio and/or visual outputs. In some embodiments, the primary device 102 further comprises one or more displays 216 and/or microphones 108 and/or speakers 218 with which the user interface module 214 may be configured to engaged to interact with the users.

Figure 3:
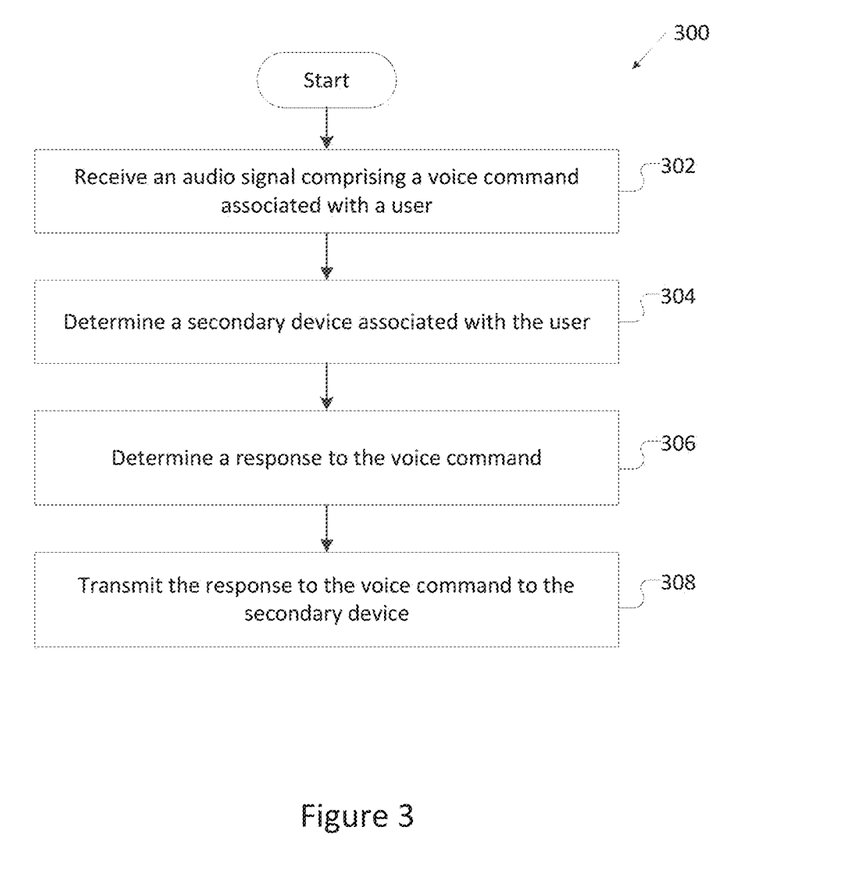
FIG. 3 is a process flow diagram depicting a method for managing voice-based commands, according to some embodiments.

Referring to FIG. 3, there is shown a process flow diagram depicting a method 300 for managing voice-based commands according to various embodiments of the present disclosure. In some embodiments, the at least one processor 200 of the primary device 102 is configured to execute instructions stored in memory 202 to cause the primary device 102 to perform method 300. For example, the at least one processor 200 of the primary device 102 may be configured to execute routing module 206, speech recognition module 208, content module 210 and biometrics module 220, and in some embodiments, authorisation module 222, to perform method 300.

At 302, the primary device 102 receives an audio signal comprising a voice command associated with a user. The voice command could be a request to perform a function. For example, such a request might be to 'play this song from Spotify' or 'play next episode of series I'm watching on Netflix'. The voice command may be received at the primary device 102 from microphone 108 of the primary device or from a secondary device 104, having been picked up by a microphone of the secondary device 104.

At 304, the primary device 102 determines a secondary device 104 associated with the user.

In some embodiments, the primary device 102 is configured to use biometric data to identify the user associated with the voice command, and accordingly an associated secondary device 104. The biometric data may be extracted from the audio signal carrying the voice command or may be received separately, for example, from a secondary device 104. The biometric data may be processed to identify the user using voice or ear print recognition techniques for example. For example, the primary device 102 may access biometric data associated with a plurality of registered users of the system 100 and compare at least part of the received biometric data with stored biometric data of the registered users to identify the user. For example, biometric data may be stored locally in memory 202 of the primary device 102, such as in user register 204 or in data storage on the cloud or otherwise remote from the primary device 102. The primary device 102 may then access a list of secondary device 104 associated with each of the registered users of the system 100 and use the identification of the user to determine the secondary device 104 associated with that user.

In some embodiments, the secondary device 104 may comprise a user activatable actuator or button (not shown) configured to send a signal to the primary device 102, for example, over the communications network 106, to indicate that the user is about to issue a voice command so that the primary device 102 then associates a next voice command from a user with the secondary device 104. The primary device 102 may then select that secondary device as the secondary device 104 to which to transmit the response to the voice command or may determine, for example, from the user register 204, another secondary device to which to route the response, for example, based on an identification of that secondary device or an identification of the user, such as using voice recognition or ear print identification techniques.

In some embodiments, where the primary device 102 receives the voice command from a secondary device 104, as opposed to from microphone 108, the primary device 102 may determine the secondary device 104 from which the voice command was received as the secondary device 104 to which to transmit the response to the voice command or may determine, for example, from the user register 204, another secondary device to which to route the response, for example, based on an identification of that secondary device or an identification of the user, such as using voice recognition or ear print identification techniques.

At 306, the primary device 102 determines a response to the voice command. For example, the primary device 102 may be configured to perform speech recognition algorithms on the received voice command and to determine a response to the deciphered request by communicating with third party servers, for example.

At 308, the primary device 102 transmits or routes the response to the voice command to the secondary device 104. In some embodiments, the primary device 102 transmits or routes the response to the voice command to the secondary device 104 over the communications network 106.

In some embodiments, prior to transmitting the response to the secondary device 104 as at 308 above, the primary device 102 authenticates the transmitting of the response by identifying or verifying the user of the secondary device 104.

In some embodiments, the primary device 102 receives authentication data, such as configuration data, from the secondary device 104 to allow the primary device 102 to have a greater degree of certainty that the response is to be provided to the issuer of the audio command or to a particular user, and thereby providing for increased levels or security and/or privacy in the system 100.

Before transmitting the response to the secondary device 104, the primary device 102 may determine whether the authentication data complies with pre-defined or expected requirements. For example, the primary device 102 may determine (i) whether a headset/headphones/earphones/earbuds of the secondary device is paired or otherwise connected to the primary device 102, (ii) the headset/headphones/earphones/earbuds are being worn by a user, and/or (iii) it is the assigned user that is wearing the headset/headphones/earphones/earbuds.

In embodiments described above where the primary device 102 determines the secondary device 104 without using voice recognition techniques, voice recognition techniques based on the voice command may nonetheless be used to authenticate the user and authorise the routing of the response.

Where the primary device 102 receives biometric data, such as voice samples or ear prints, the primary device 102 may compare the received biometric data with voice samples and/or ear prints of the registered users, as may be stored, for example, in the user register 204. If the received biometric data matches the biometric template of a registered user (for example, within a given tolerance) and that registered user is the user associated with the selected secondary device, the primary device 102 may authorise the transmitting of the response to the secondary device 104. On the other hand, if the received biometric data does not match a biometric template of a registered user or does match a biometric template of a registered user but that registered user is not the user associated with the selected secondary device, authorisation may be denied and no response would be transmitted to the selected secondary device 104.

Example Use Cases

Referring again to FIG. 1 and considering a case where the secondary device 104A is a headset/headphones without a microphone. When user A, wearing the headset/headphones 104A, issues a voice command, it is picked up by the microphone 108 of the primary device 102. The primary device 102 processes the request to determine the secondary device 104 to which the response should be routed and to determine a response to the request. For example, the primary device 102 identifies User A as having issued the voice command and determines headset/headphones 104A as being the secondary device associated with User A. The primary device 102 routes the response to the headset/headphones 104A. As discussed above, the headset/headphones 104A may provide authentication data to the primary device 102 and the primary device 102 may check the authentication data to ensure compliance with pre-defined or required standards prior to transmitting the response to the headset/headphones 104A of user A.

Referring again to FIG. 1 and considering a case where the secondary device 104B is a headset/headphones/earphones/earbuds with a microphone. When User B, wearing or using the headset/headphones/earphones/earbuds, issues a voice command, it is picked up by the microphone of the secondary device 104B as opposed to the microphone 108 of the primary device 102. For example, User B may be in an area isolated from and without directed audio connection to the primary device 102, for example, in a different room from that of the primary device 102. The headset/headphones/earphones/earbuds 104B transmits or streams an audio signal associated with the voice command to the primary device 102. The primary device 102 processes the request to determine the secondary device 104 to which the response should be routed and to determine a response to the request. For example, the primary device 102 identifies the headset/headphones/earphones/earbuds 104B as being associated with the request and as being the secondary device 104 to which to route the response. The primary device 102 routes the response to the headset/headphones/earphones/earbuds 104B associated with user B. As discussed above, the headset/headphones/earphones/earbuds 104*b* may provide authentication data to the primary device 102 and the primary device 102 may check the authentication data to ensure compliance with pre-defined or required standards prior to transmitting the response to the headset/headphones/earphones/earbuds 104B. For example, the headset/headphones/earphones/earbuds 104*b* may provide an ear print of the user to the primary device and the primary device may determine whether the received ear print matches the biometric template for the user before transmitting the response to the headset/headphones/earphones/earbuds 104*b*.

Referring again to FIG. 1 and considering a case where the secondary device 104B is a headset/headphones with a microphone and User A is in the vicinity of User B wearing/using the secondary device 104B. When User A issues a voice command, it is picked up by the microphone of the secondary device 104B as opposed to the microphone 108 of the primary device 102. The headset/headphones 104B transmits or streams an audio signal associated with the voice command to the primary device 102. The primary device 102 processes the request to determine the secondary device 104 to which the response should be routed and to determine a response to the request. For example, regardless of the fact that the voice command was received from headset/headphones 104B, the primary device 102 may determine an identity of the user issuing the voice command, for example, by performing voice recognition algorithms, and using the user identifier to determine a secondary device associated with the user to which to route the response. The primary device 102 routes the response to the secondary device 104 associated with User A. Again, and as discussed above, the headset/headphones 104B or indeed secondary device 104A may provide authentication data to the primary device 102 and the primary device 102 may check the authentication data to ensure compliance with pre-defined or required standards prior to transmitting the response to the headset/headphones 104B.

Referring again to FIG. 1 and considering a case where the secondary device 104C associated with User C comprises a display device, such as a smartphone and optionally one or more microphones and optionally a headset/headphones. When user C, using the display device 104C, issues a voice command, it is picked up by the microphone 108 of the primary device 102. The primary device 102 identifies the secondary device 104C associated with the request and determines a response to the request. The primary device 102 routes the response to the display device, and/or to the headset/headphones associated with User C. Alternatively, when User C, using the display device, issues a voice command, it is picked up by the microphone 114 of the secondary device 104C as opposed to the microphone 108 of the primary device 102. The display device 104*c* transmits or streams an audio signal associated with the voice command to the primary device 102. The primary device 102 identifies the display device 104C as being associated with the request and determines a response to the request. The primary device 102 routes the response to the display device 104C and/or to the headset/headphones associated with user C.

As discussed above, the display device 104C may provide authentication data to the primary device 102 and the primary device 102 may check the authentication data to ensure compliance with pre-defined or required standards prior to transmitting the response to the display device 104C of user C. For example, such authentication data may include (i) whether the display device 104*c* is paired or otherwise connected to the primary device 102, and/or (ii) whether it is the assigned user that is using the display device 104C.

The functionality of the primary device 102 may be implemented in firmware and/or software. If implemented in firmware and/or software, the functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc includes compact discs (CDs), laser discs, optical discs, digital versatile discs (DVDs), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

It is noted that the term 'module' shall be used herein to refer to a functional unit, component or module which may be implemented at least partly by dedicated hardware components such as custom defined circuitry and/or at least partly be implemented by one or more software processors or appropriate code running on a suitable general purpose processor or the like. A module may itself comprise other modules or functional units.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

It should be noted that the above-mentioned embodiments illustrate rather than limit the invention, and that those skilled in the art will be able to design many alternative embodiments without departing from the scope of the appended claims. The present embodiments are, therefore, to be considered in all respects as illustrative and not restrictive. The word "a" or "an" does not exclude a plurality, and a single feature or other unit may fulfil the functions of several units recited in the claims. Additionally the term "gain" does not exclude "attenuation" and vice-versa. Any reference numerals or labels in the claims shall not be construed so as to limit their scope.

The invention claimed is:

1. A primary device arranged to communicate with one or more secondary devices across a communications network, the primary device comprising:
   at least one processor;
   memory comprising computer executable instructions, which when executed by the at least one processor, are configured to:
      receive an audio signal comprising a voice command associated with a user;
      identify the user based on the voice command;
      access a user register, wherein the user register comprises at least one registered user identifier and one or more secondary device identifiers associated with each of the at least one registered user identifiers;
      determine a registered user identifier of the user register associated with the identified user;
      determine, from the user register and using the determined identifier, a secondary device associated with the identified user from the one or more secondary devices; and
      transmit a response to the voice command to the determined secondary device, wherein the response to the voice command is to be provided to a user of the determined secondary device.

2. The primary device of claim 1, wherein the secondary device is one of: (i) a headset/headphones/earphones/earbuds and (ii) a smartphone.

3. The primary device of claim 1, wherein prior to receiving the audio signal, the at least one processor is configured to receive a notification signal to expect to receive the audio command and to determine the secondary device associated with the user based on the notification signal.

4. The primary device of claim 1, wherein the at least one processor is configured to identify the user based on received biometric data and to determine the secondary device associated with the user based on the identification of the user.

5. The primary device of claim 4, wherein the at least one processor is configured to access a user register to determine the secondary device, wherein the user register comprises biometric data and one or more secondary device identifiers for each registered user.

6. The primary device of claim 4, wherein identifying the user based on received biometric data comprises comparing ear features of received biometric data to stored biometric templates of registered users, wherein the biometric templates include ear prints for the users.

7. The primary device of claim 4, wherein identifying the user based on biometric data comprises comparing voice features of received biometric data associated with the issuer of the voice command to stored biometric templates of registered users, wherein the biometric templates include voice features for the users.

8. The primary device of claim 1, wherein the primary device comprises one or more microphones configured to receive audio signals and to provide the audio signals to the processor and wherein the audio signal comprising the voice command associated with the user is received by the one or more microphones of the primary device.

9. The primary device of claim 1, wherein the audio signal comprising the voice command associated with the user is received from a secondary device of the one or more secondary devices.

10. The primary device of claim 1, wherein the audio signal comprising the voice command associated with the user is received from a secondary device of the one or more secondary devices and wherein the secondary device is determined to be the secondary device from which voice command is received.

11. The primary device of claim 1, wherein the primary device is further configured to receive authentication data and verify the authentication data prior to transmitting the response to the secondary device.

12. The primary device of claim 11, wherein the authentication data comprises one or more of: (i) an indicator indicating that the secondary device is paired or otherwise connected with the primary device, (ii) an indicator indicating that the secondary device is being worn or used by a user, and/or (iii) an indicator indicating that it is the assigned user that is wearing or using the secondary device.

13. The primary device of claim 11, wherein the authorisation data comprises biometric data.

14. The primary device of claim 13, wherein prior to routing the response, the primary device is configured to authorise the routing of the response to the secondary device by verifying biometric data of the user associated with the secondary device.

15. The primary device of claim 13, wherein the biometric data is extracted from the voice command and/or is received from a secondary device.

16. The primary device of claim 14, wherein the primary device is configured to verify the user based on biometric data by comparing ear features of the biometric data to stored biometric templates of registered users, wherein the biometric templates include ear prints for the users, and determining that the biometric data matches the stored biometric template within a given tolerance.

17. The primary device of claim 16, wherein the biometric data comprises (i) ear prints associated with the issuer of the voice command and/or (ii) ear prints associated with a user wearing a headset/earphones of the secondary device.

18. A method for managing voice-based commands, the method comprising:
receiving, at a primary device arranged to communicate with one or more secondary devices across a communications network, an audio signal comprising a voice command associated with a user;
identifying the user based on the voice command;
accessing a user register, wherein the user register comprises at least one registered user identifier and one or more secondary device identifiers associated with each of the at least one registered user identifiers;
determining a registered user identifier of the user register associated with the identified user;
determining, from the user register and using the determined identifier, a secondary device associated with the identified user from the one or more secondary devices; and
transmitting a response to the voice command to the determined secondary device wherein the response to the voice command is to be provided to a user of the determined secondary device.

19. A non-transitory computer-readable storage medium comprising instructions which, when executed by at least one processor, cause the at least one processor to carry out the method of claim 18.

* * * * *

UNITED STATES PATENT AND TRADEMARK OFFICE
CERTIFICATE OF CORRECTION

PATENT NO. : 11,069,363 B2
APPLICATION NO. : 16/229411
DATED : July 20, 2021
INVENTOR(S) : Reed et al.

Page 1 of 1

It is certified that error appears in the above-identified patent and that said Letters Patent is hereby corrected as shown below:

In the Specification

1. In Column 7, Line 39, delete "204" and insert -- 104 --, therefor.

2. In Column 12, Line 50, delete "device 104c" and insert -- device 104C --, therefor.

In the Claims

3. In Column 16, Line 18, in Claim 18, delete "device" and insert -- device, --, therefor.

Signed and Sealed this
Fifteenth Day of August, 2023

Katherine Kelly Vidal
*Director of the United States Patent and Trademark Office*